H. M. P. MURPHY.
AIR BRAKE APPARATUS.
APPLICATION FILED APR. 4, 1908.

912,717.

Patented Feb. 16, 1909.

Witnesses:
Jas. E. Hutchinson
G. F. Downing

Inventor
H. M. P. Murphy
By H. G. Seymour
Attorney

UNITED STATES PATENT OFFICE.

HOWARD M. P. MURPHY, OF PITTSBURG, PENNSYLVANIA, ASSIGNOR OF ONE-FOURTH TO L. H. BOWMAN, OF MUNHALL, PENNSYLVANIA, AND ONE-EIGHTH TO JOSEPH M. FLANNERY, OF PITTSBURG, PENNSYLVANIA.

AIR-BRAKE APPARATUS.

No. 912,717.  Specification of Letters Patent.  Patented Feb. 16, 1909.

Application filed April 4, 1908. Serial No. 425,197.

*To all whom it may concern:*

Be it known that I, HOWARD M. P. MURPHY, a resident of Pittsburg, in the county of Allegheny and State of Pennsylvania, have invented certain new and useful Improvements in Air-Brake Apparatus; and I do hereby declare the following to be a full, clear, and exact description of the invention, such as will enable others skilled in the art to which it appertains to make and use the same.

This invention relates to improvements in air brake mechanism and more particularly to means for controlling the operation of a brake valve such as is usually employed to be manually operated by the engineer for controlling the operation of triple valve mechanism in effecting the application and release of the brakes.

The object of my present invention is to provide simple and efficient means for insuring the proper operation of the "brake valve" for trains of different lengths, so that an engineer will be prevented from accidentally causing an excessive rise or fall of train pipe pressure on trains of moderate length or on short trains.

A further object is to so construct the device that it can be set for controlling the brakes of from one to any desired number of cars.

With these objects in view, the invention consists in certain novel features of construction and combinations and arrangements of parts as hereinafter set forth and pointed out in the claims.

Figure 1:
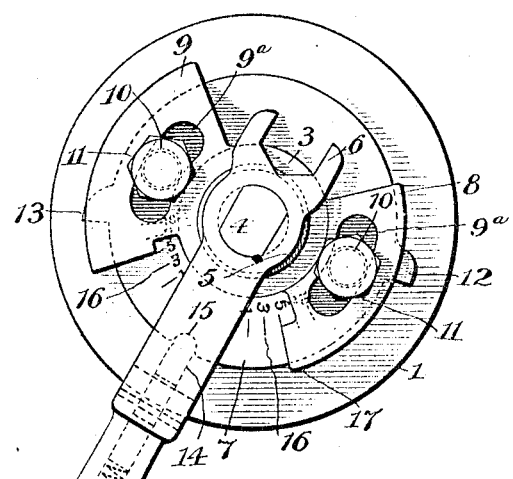
Figure 2:
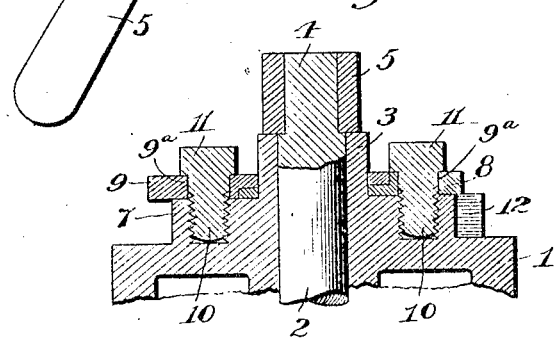

In the accompanying drawings: Figure 1 is a plan view of a "brake valve" embodying my improvements, and Fig. 2 is a sectional view on the line *a—a* of Fig. 1.

1 represents the head or end portion of a "brake valve" casing, and 2 the shaft or spindle of the valve,—which latter may be of any preferred form of construction. The head of the casing is provided with a sleeve or annular extension 3, through which the spindle 2 passes and beyond which the angular portion 4 of the spindle projects, for the reception of an operating lever or handle 5. The end of the lever or handle 5 may be made to form a wrench 6 for a purpose hereinafter explained.

A portion 7 of the head 1, may be made of a diameter somewhat less than that of the head 1 and upon this portion of the casing head, two segments 8—9 are movably disposed. These segments are provided with annular overlapping portions which encircle the sleeve 3, and each segment is also provided with an elongated slot 9ª for the passage of a screw 10, the threaded portion of which enters the portion 7 of the valve casing, and the heads 11 of the screws 10 are adapted to engage the upper faces of the segments and retain the latter in any position to which they may be adjusted. Lugs or stops 12—13 project laterally from the portion 7 of the casing, in position to be engaged by a spring-pressed rod or bar 14 carried by the lever or handle 5 when the latter is swung in one direction or the other from its intermediate position, for the purpose of making an emergency application or a release of the brakes. Normally, the spring-pressed rod or bar 14 may engage a notch 15 in the portion 7 of the casing, when the valve will be in a "lap" position.

The respective segments 8—9 may be made to register with graduations 16 which may be numbered to designate different numbers of cars of which a given train may be composed, so that when the segments are adjusted to register with certain of said graduations, the movement of the hand lever 5 will be limited by the engagement of the rod or bar 14 with one or the other of the segments, and thus prevent the valve from being opened too far for applying or releasing the brakes on the number of cars which may, at this time, compose the train.

It will be observed that the segment 8 is somewhat narrower than the segment 9, so that the spring-pressed rod 14 will engage a corner 17 thereof and thus check the movement of the lever or handle 5, but permit the latter, by added pressure to the handle, to pass said corner 17, and thus allow the handle to be moved until the stop 12 is reached should it be desired to make an emergency application of the brakes.

It is evident that the portion 6 of the lever or handle 5 may be utilized for loosening and tightening the screws 10 with which the segments are to be adjusted,—said handle being readily removable from the valve spindle.

Various slight changes might be made in the details of construction of my invention without departing from the spirit thereof or limiting its scope and hence I do not wish to limit myself to the precise details herein set forth.

Having fully described my invention what I claim as new and desire to secure by Letters Patent is:

1. The combination with a manually operated brake valve, of adjustable means for graduating the throw of said valve in effecting a release or an application of the brakes.

2. The combination with a manually operated brake valve, of stops for limiting the throw of said valve, and means for securing said stops at different adjustments.

3. The combination with a brake valve and an operating handle therefor, of two segments for limiting the movements of said handle, and means for securing said segments at different adjustments.

4. The combination with a brake valve, a handle attached thereto, and rigid stops for fixing the maximum throw of said handle in both directions, of two adjustable stops, and means for securing said adjustable stops at any desired adjustment.

5. The combination with a brake valve and its casing, the latter having two sets of numbered graduations, of a handle for operating the valve, and two adjustable stops for the handle, said adjustable stops being adaptable to any of the respective series of graduations.

6. The combination with a brake valve, an operating handle, and rigid stops for fixing the maximum throw of the handle in both directions, of two adjustable segments, means for securing said segments at different adjustments, a spring-pressed bar carried by the handle and adapted to engage said segments, one of said segments being of such width as to be engaged by said spring-pressed bar but adapted to permit the passage of said bar and the handle when added force is applied to the latter, whereby the valve can be moved for an "emergency" application of the brake, notwithstanding said adjustable segment.

7. The combination with a brake valve, a handle therefor removably attached to the valve and provided with a wrench-end, of adjustable segments constituting stops for the handle, each of said segments having a slot, and headed screws passing through said slots and entering the valve casing for securing the segments at any desired adjustment.

8. The combination with a manually operated brake valve, of adjustable means for graduating the throw of said valve in effecting a release or an application of the brakes, and a lever for operating the valve, said lever being removable from the valve spindle and provided with a wrench-end.

In testimony whereof, I have signed this specification in the presence of two subscribing witnesses.

HOWARD M. P. MURPHY.

Witnesses:
A. N. MITCHELL,
A. S. FERGUSON.